US012367871B2

(12) United States Patent
King et al.

(10) Patent No.: US 12,367,871 B2
(45) Date of Patent: Jul. 22, 2025

(54) AUTOMATED DETECTION AND TRACKING OF CONVERSATIONS OF INTEREST IN CROWDED AREAS

(71) Applicant: MOTOROLA SOLUTIONS, INC., Chicago, IL (US)

(72) Inventors: Melanie King, Wesley Chapel, FL (US); Joseph Namm, Plantation, FL (US); Jeet K. Pawani, Sunrise, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 322 days.

(21) Appl. No.: 18/148,242

(22) Filed: Dec. 29, 2022

(65) Prior Publication Data

US 2024/0221733 A1 Jul. 4, 2024

(51) Int. Cl.
*G10L 15/18* (2013.01)
*G10L 25/51* (2013.01)
*H04R 3/00* (2006.01)

(52) U.S. Cl.
CPC .......... *G10L 15/1822* (2013.01); *G10L 25/51* (2013.01); *H04R 3/005* (2013.01)

(58) Field of Classification Search
CPC . G10L 15/1822; G10L 25/51; G10L 21/0208; G10L 2021/02087;

(Continued)

(56) References Cited

U.S. PATENT DOCUMENTS 8,184,180 B2 5/2012 Beaucoup
9,736,580 B2 8/2017 Cahill et al.
(Continued)

FOREIGN PATENT DOCUMENTS

KR 20080047654 A 5/2008
WO 2011025085 A1 3/2011

OTHER PUBLICATIONS

Crocco, et al., "Audio Tracking in Noisy Environments by Acoustic Map and Spectral Signature," IEEE Transactions on Cybernetics, vol. 48, No. 5, May 2018 (pp. 1619-1632).

(Continued)

*Primary Examiner* — Yogeshkumar Patel
(74) *Attorney, Agent, or Firm* — Michael Best & Friedrich LLP

(57) ABSTRACT

Systems and methods for detecting and tracking conversations of interest in crowded areas. The system includes a plurality of body worn portable public safety communication devices, each including a plurality of microphones and an electronic processor. The electronic processor is configured to generate, using the plurality of microphones, a plurality of beams and scan in parallel, using the plurality of beams, a plurality of simultaneous audio conversations. The electronic processor is configured to identify and isolate a plurality of conversations of interest from among the audio conversations based on predetermined characteristics indicative of a potential threat. The electronic processor is configured to determine that at least two of the plurality of conversations of interest are potentially linked to a single potential threat, compile them for playback or transcription, and generate an alert indicating the availability of the linked conversations of interest.

22 Claims, 8 Drawing Sheets

(58) Field of Classification Search
CPC .. G10L 2021/02082; G10L 2021/0216; H04R 1/406; H04R 3/005; H04R 2201/401; H04R 2201/403; H04R 2430/23; G08B 13/19647; G08B 21/0446; G08B 21/0453; G01S 17/04; G01S 17/894; G01S 13/04
See application file for complete search history.

(56) References Cited

U.S. PATENT DOCUMENTS

| | | | |
|---|---|---|---|
| 9,740,940 | B2 | 8/2017 | Chattopadhyay et al. |
| 10,859,693 | B1* | 12/2020 | Sabripour ............. G01S 13/931 |
| 10,873,727 | B2 | 12/2020 | Mughal et al. |
| 11,188,775 | B2 | 11/2021 | Sabripour et al. |
| 11,373,672 | B2 | 6/2022 | Mesgarani et al. |
| 2012/0002047 | A1 | 1/2012 | An et al. |
| 2016/0379472 | A1* | 12/2016 | Schuler ................. H04W 76/50 |
| | | | 340/539.11 |
| 2018/0376111 | A1 | 12/2018 | Mrowiec et al. |
| 2019/0349551 | A1* | 11/2019 | Mughal ................. H04R 1/406 |
| 2022/0057519 | A1* | 2/2022 | Goldstein ............. G01S 17/88 |
| 2022/0159403 | A1* | 5/2022 | Sporer ................... H04S 7/302 |

OTHER PUBLICATIONS

Shotspotter, "Partner Release: Genetec Inc. Integrates ShotSpotter Gunshot Detection Technology in Security Center," Montreal, QC, <https://www.shotspotter.com/press-releases/partner-release-genetec-inc-integrates-shotspotter-gunshot-detection-technology-in-security-center/> released Mar. 30, 2017, (3 pages).

* cited by examiner

AUTOMATED DETECTION AND TRACKING OF CONVERSATIONS OF INTEREST IN CROWDED AREAS

BACKGROUND OF THE INVENTION

Public safety and other personnel use body worn and other portable communication devices (e.g., radio speaker microphones and body worn cameras) to facilitate communication during their operations. These devices use beamforming arrays made up of multiple microphones (e.g., a broadside array or an end fire array) to form multiple beams. Beamforming algorithms may be used to steer the beam patterns toward desired sounds (e.g., speech generated by a conversation).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features of concepts that include the claimed subject matter and explain various principles and advantages of those embodiments, examples, aspects, and features.

Figure 1:
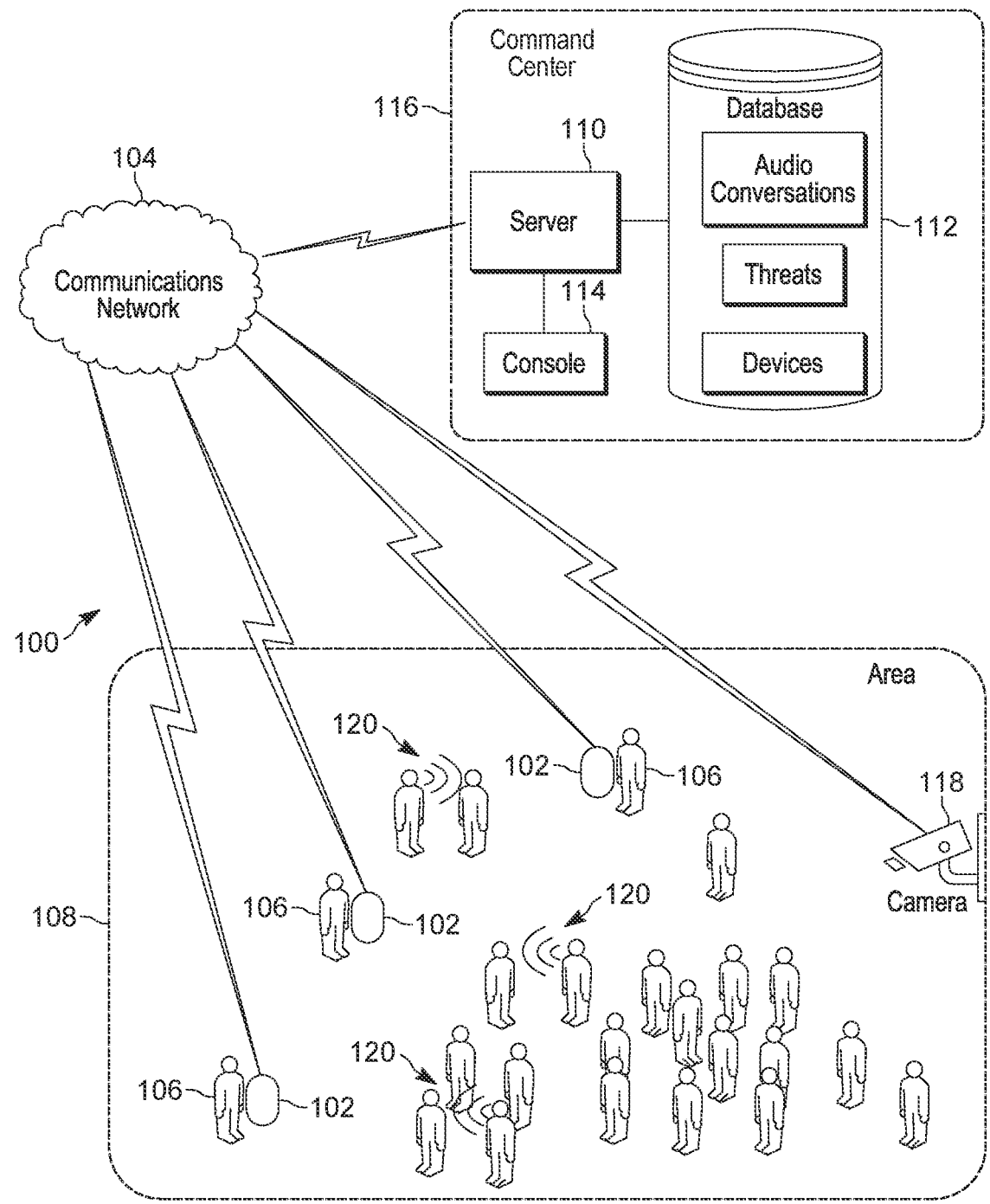
FIG. 1 illustrates a system detecting and tracking conversations of interest in crowded areas according to some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples, aspects, and features illustrated.

In some instances, the apparatus and method components have been represented where appropriate by conventional symbols in the drawings, showing only those specific details that are pertinent to understanding the of various embodiments, examples, aspects, and features so as not to obscure the disclosure with details that will be readily apparent to those of ordinary skill in the art having the benefit of the description herein.

DETAILED DESCRIPTION OF THE INVENTION

In large public venues when many people gather or pass through (e.g., airports, transit stations, sports stadiums, entertainment venues, government buildings, and the like), it is desirable to monitor activities occurring within the venue to provide security for the public. For example, some people within a facility may be seeking to cause harm to other people, to the facility itself, or both. In another example, kidnapping or human trafficking victims may be transported by their captors through these venues. In another example, a situation between two or more people may be escalating toward potential violence or another undesirable outcome. In a crowded venue, some people may feel more comfortable to speak freely, since they may think that they can be camouflaged. Monitoring ambient audio to detect conversations indicative of problems may help public safety personnel and other place guardians to detect and prevent threats or to mitigate problematic situations.

However, because such venues are often crowded with many people, there are many simultaneous conversations occurring. In addition, some of these conversations may be spoken in a language foreign to the venue's place guardians. Furthermore, in crowded area, a gaze to a person from a place guardian may cause them to behave differently.

To address, among other things, these problems, systems and methods are provided herein for automatically detecting and tracking conversations of interest to provide place guardians information about the persons speaking without the persons noticing that place guardians are paying attention to them. Using the examples and aspects presented herein, venue security may be enhanced by isolating and tracking conversations of interest and providing making translations available to place guardians when needed (e.g., in real-time or post conversation).

Embodiments and aspects described herein provide electronic communication devices, which operate in concert to scan conversations using beamforming scanning in a crowded venue. The scanned conversations are analyzed (e.g., using audio analytics) to detect conversations of interest from among those scanned. Multiple devices may be coordinated based on their locations and orientations, to provide for efficient coverage of large areas and amounts of people. Using such embodiments, conversations of interest may be played in real-time to a place guardian, marked (e.g., with indication of the content) on a video or picture on a handheld device to be played upon request, or both. Identified conversations may be followed by multiple devices as they move through the venue.

Automatically identifying and tracking such conversations can reduce false negative and positive indications or threats, reducing the misuse of resources, which in turn leads to more efficient use of communications networks and computing resources and improves the response to public safety incidents. Such embodiments also provide more efficient use of communications infrastructure by directing resources in a targeted fashion.

One example provides a communication system for detecting and tracking conversations of interest in crowded areas. The system includes a plurality of body worn portable public safety communication devices operating in a crowded area. Each of the plurality of body worn public safety communication devices including a plurality of microphones and an electronic processor. The electronic processor is configured to generate, using the plurality of microphones, a plurality of beams. The electronic processor is configured to scan in parallel, using the plurality of beams, a plurality of simultaneous audio conversations taking place in the crowded area. The electronic processor is configured to identify and isolate, using audio analytics, a plurality of conversations of interest from among the plurality of scanned audio conversations based on predetermined characteristics indicative of a potential threat. The electronic processor is configured to determine that at least two of the plurality of conversations of interest are potentially linked to a single potential threat. The electronic processor is configured to, responsive to determining that the at least two of the plurality of conversations of interest are potentially linked to the single potential threat, compile the at least two of the plurality of conversations of interest for playback or transcription. The electronic processor is configured to generate an alert indicating the availability of the at least two of the plurality of conversations of interest.

Another example embodiment provides a method for operating a communication system to detect and track conversations of interest in crowded areas. The method includes generating, using a plurality of microphones for a body worn portable public safety communication device, a plurality of beams. The method includes scanning in parallel, using the plurality of beams, a plurality of simultaneous audio conversations taking place in the crowded area. The method includes identifying and isolating, using audio analytics, a plurality of conversations of interest from among the plurality of scanned audio conversations based on predetermined characteristics indicative of a potential threat. The method includes determining that at least two of the plurality of conversations of interest are potentially linked to a single potential threat. The method includes compiling the at least two of the plurality of conversations of interest for playback or transcription. The method includes generating an alert indicating the availability of the at least two of the plurality of conversations of interest.

For ease of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

It should be understood that although certain figures presented herein illustrate hardware and software located within particular devices, these depictions are for illustrative purposes only. In some instances, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 is a diagram of an example communication system 100, which is configured to, among other things, detect and track conversations of interest in public venues and other crowded areas. In the example illustrated, the system 100 includes a plurality of communication devices 102 communicatively coupled by a communications network 104. The communications network 104 may be implemented using various local and wide area networks, for example, a Bluetooth™ network, a Wi-Fi network), the Internet, a land mobile radio network, a cellular data network, a Long Term Evolution (LTE) network, a 4G network, a 5G network, or combinations or derivatives thereof. In some embodiments, the communications network 104 is a private wireless network.

Each of the communication devices 102 is operated by a place guardian 106 (e.g., a security guard, a public safety officer, an emergency medical technician, a firefighter, and the like). The place guardians are deployed throughout an area 108. The area 108 may be part of a public or private venue, such as an airport, a transit center, a shopping mall, a sports stadium, and the like. The area 108 may include indoor areas, outdoor areas, or both. As illustrated in FIG. 1, the area 108 may be populated with many people (e.g., travelers, spectators, shoppers, employees, and the like) gathered into multiple groups of various sizes. It should be noted that the examples described herein are applicable to cover multiple areas or venues.

The system 100 may also include a server 110, a database 112, and a console 114 deployed, for example, in a command center 116. The command center 116 may be used to, among other things, manage the operations of the place guardians 106. In some instances, the command center 116 is a public safety dispatch center or a mobile command center. In some instances, the server 110, the database 112, and the console 114 may be distributed among multiple locations and communicatively coupled to one another via one or more communications networks.

The components of the command center 116 are communicatively coupled to one another and to the communication devices 102 and a camera 118. The camera 118 is positioned to capture video of the area 108 within the field of view of the camera 118. In some instances, multiple cameras may be deployed to capture video of substantially all of the area 108.

As described herein, the components of the system 100 operate to, among other things scan for audio conversations 120 taking place within the area 108. The communication devices 102, described more particularly with respect to FIG. 2, include microphone arrays capable of discerning and capturing one or more of the audio conversations 120 using multiple beams.

In some instances, as described herein, the server 110 and the database 112 operate to, among other things, analyze audio (e.g., received from the communication devices 102) and video (e.g., received from the camera 118) to identify and track conversations of interest from among the audio conversations 120. The server 110 is a computer server including an electronic processor, a memory, and a communication interface configured to operate as described herein. In some instances, the server 110 includes a video analytics engine to analyze images to, among other things, identify and detect objects within the images, for example, by implementing one or more object classifiers.

The server 110 is communicatively coupled to, and writes data to and from, the database 112. In the example illustrated, the database 112 is a database housed on a suitable database server communicatively coupled to and accessible by the server 110. In some instances, the database 112 is part of a cloud-based database system external to the system 100 and accessible by the server 110 over one or more wired or wireless networks. In other instances, all or part of the database 112 is locally stored on the server 110. In some examples, the server 110 and the database 112 are part of a computer-aided dispatch system. As illustrated in FIG. 1, in some instances the database 112 electronically stores audio conversation data, threat data, and device data. Audio conversation data includes recordings and/or transcriptions of conversations of interest captured by the communication devices 102. Threat data includes information pertaining to potential threats, past threats, and current threat situations. Device data includes information pertaining to the communication devices operating in the area 108 (e.g., the locations of the devices, the orientation of the devices, the current statuses of the devices, and the capabilities of the devices).

The console 114 is a computer terminal operated by an operator. In some aspects, the console 114 is a computer-aided dispatch terminal for accessing or controlling functions on the server 110. In other aspects, the console 114 is a computer that includes an electronic processor (e.g., a microprocessor, or other electronic processor), a memory, a network interface, a suitable electronic display, and other various modules coupled directly, by one or more control or data buses, or a combination thereof. The console 114 sends and receives data over the communications network 104 using the network interface. While the console 114 is described herein with reference to a single operator, in some embodiments, the console 114 includes a plurality of consoles that are each operated by one or more operators.

The communication devices 102 may communicate with one another directly, through the communications network 104, through the server 110, or through a combination of approaches.

Figure 2:
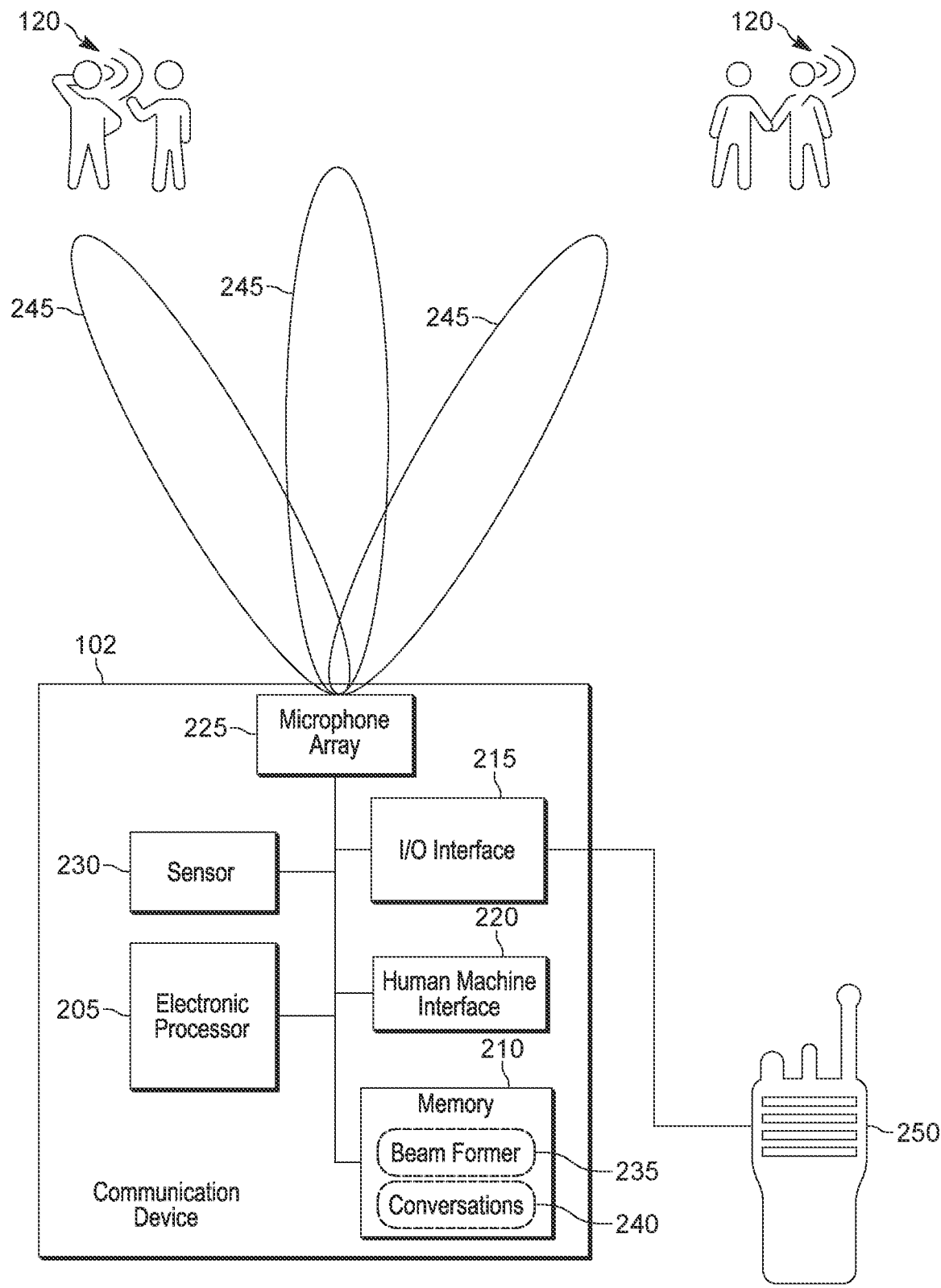
FIG. 2 is a block diagram of a communication device of the system of FIG. 1 according to some examples.

FIG. 2 is a block diagram of an example communication device 102. In the illustrated example, the communication device 102 is a remote speaker microphone (RSM) (e.g., a Motorola® APX™ XE Remote Speaker Microphone). In other examples, the communication device may be a portable radio, a smart telephone, a body worn camera, or another suitable body worn electronic device including software and hardware configured to operate as described herein.

The communication device 102 includes an electronic processor 205, a memory 210, an input/output (I/O) interface 215, a human machine interface 220, a microphone array 225, and a sensor 230. The illustrated components, along with other various modules and components are coupled to each other by or through one or more control or data buses that enable communication therebetween.

In the example illustrated, the communication device 102 is communicatively coupled to a portable radio 250 to provide input (e.g., an output audio signal) to and receive output from the portable radio 250. The portable radio 250 may be a portable two-way radio, for example, one of the Motorola® APX™ family of radios.

The electronic processor 205 obtains and provides information (e.g., from the memory 210 and/or the input/output interface 215), and processes the information by executing one or more software instructions or modules, capable of being stored, for example, in a random access memory ("RAM") area or a read only memory ("ROM") of the memory 210 or in another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

In some embodiments, the electronic processor 205 performs machine learning functions. Machine learning generally refers to the ability of a computer program to learn without being explicitly programmed. In some embodiments, a computer program (e.g., a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using all of these approaches, a computer program can ingest, parse, and understand data and progressively refine algorithms for data analytics.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, an adaptive beam former 235 and audio conversations 240, as described herein.

The input/output interface 215 is configured to receive input and to provide system output. The input/output interface 215 obtains information and signals from, and provides information and signals to, (e.g., over one or more wired and/or wireless connections) devices both internal and external to the communication device 102.

The human machine interface (HMI) 220 receives input from, and provides output to, users of the communication device 102. The HMI 220 may include a keypad, switches, buttons, soft keys, indictor lights, haptic vibrators, a display (e.g., a touchscreen), or the like. In some embodiments, the communication device 102 is user configurable via the human machine interface 220.

The microphone array 225 includes multiple microphones that sense sound, for example, the sound waves generated by the conversations 120. The microphone array 225 converts the sound waves to electrical signals, and transmits the electrical signals to the electronic processor 205. The electronic processor 205 processes the electrical signals received from the microphone array 225, for example, using the adaptive beamformer 235 to produce an audio signal representative of the conversation 120. The electronic processor 205, using the adaptive beamformer 235, produces multiple beams, which it can steer to aim toward or away from a sound source. For example, as illustrated in FIG. 2, three beams 245 are produced, which may be capable of focusing on sounds produced by one or both of the conversations 120. The electronic processor 205 chooses from among the beams 245 to receive audio.

As a body worn device, the communication device 102 may be oriented (with respect to the ground when the wearer is standing) vertically, horizontally, or another angle. In some instances, the sensor 230 may be a gyroscopic sensor that produces electrical signals representative of the orientation of the communication device 102.

In some instances, the communication device 102 is equipped with geolocation hardware and software for determining a location for the communication device 102. In some instances, the communication device 102 is configured to determine its location via radiofrequency triangulation. In some instances, the communication device 102 receives information about its location from another device (e.g., the portable radio 250 or the server 110).

Figure 3:
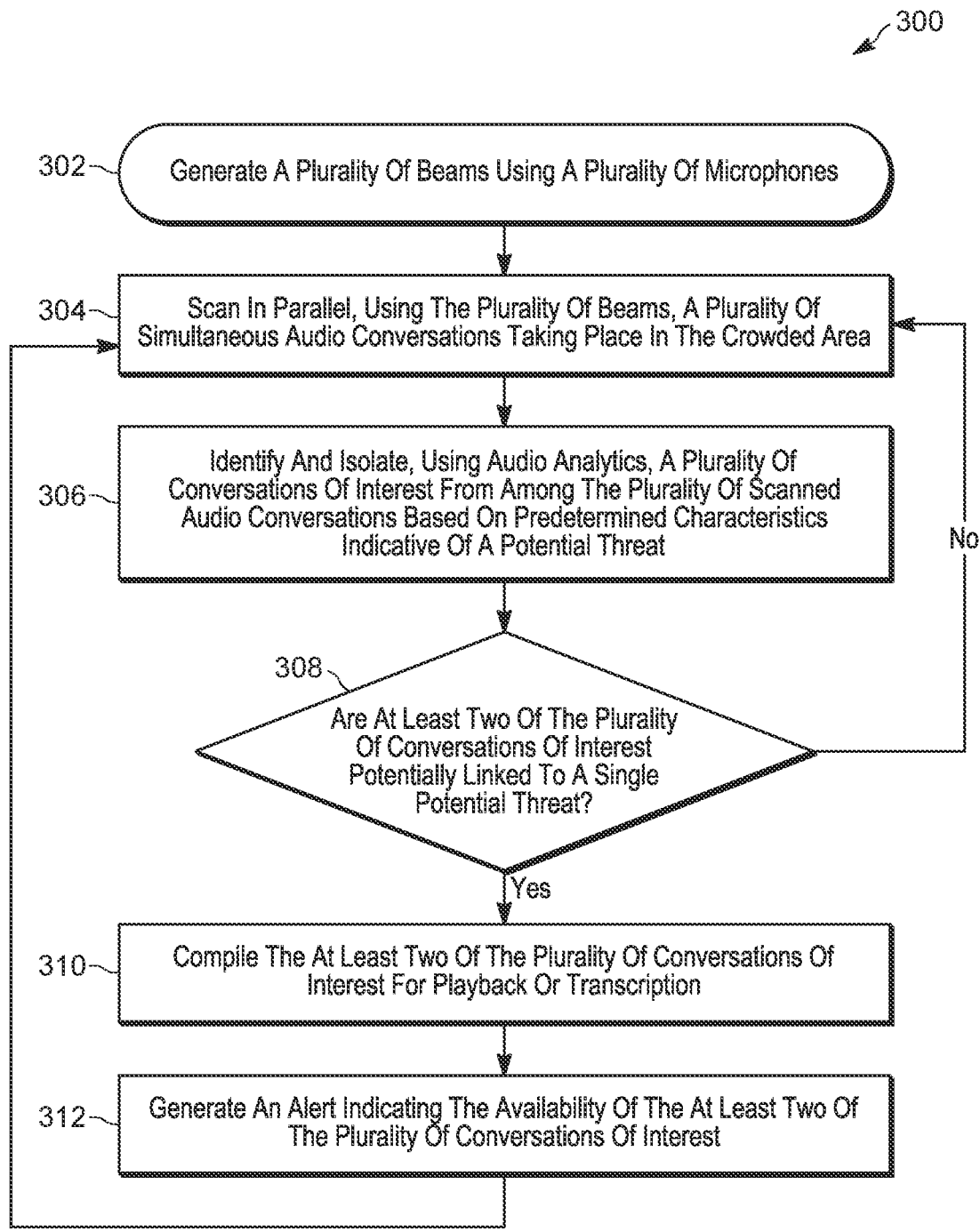
FIG. 3 is a flowchart illustrating a method for detecting and tracking conversations of interest in crowded areas according to some examples.

FIG. 3 illustrates an example method 300 for detecting and tracking conversations of interest. Although the method 300 is described in conjunction with the system 100 as described herein, the method 300 could be used with other systems and devices. In addition, the method 300 may be modified or performed differently than the specific example provided.

As an example, the method 300 is described as being performed by a communication device 102 and, in particular, by the electronic processor 205. However, it should be understood that, in some embodiments, portions of the method 300 may be performed by other devices, including for example, the server 110. For ease of description, the method 300 is described in terms of a single communication device. The method 300 is applicable to multiple communication devices operating together, as described herein.

Figure 4:
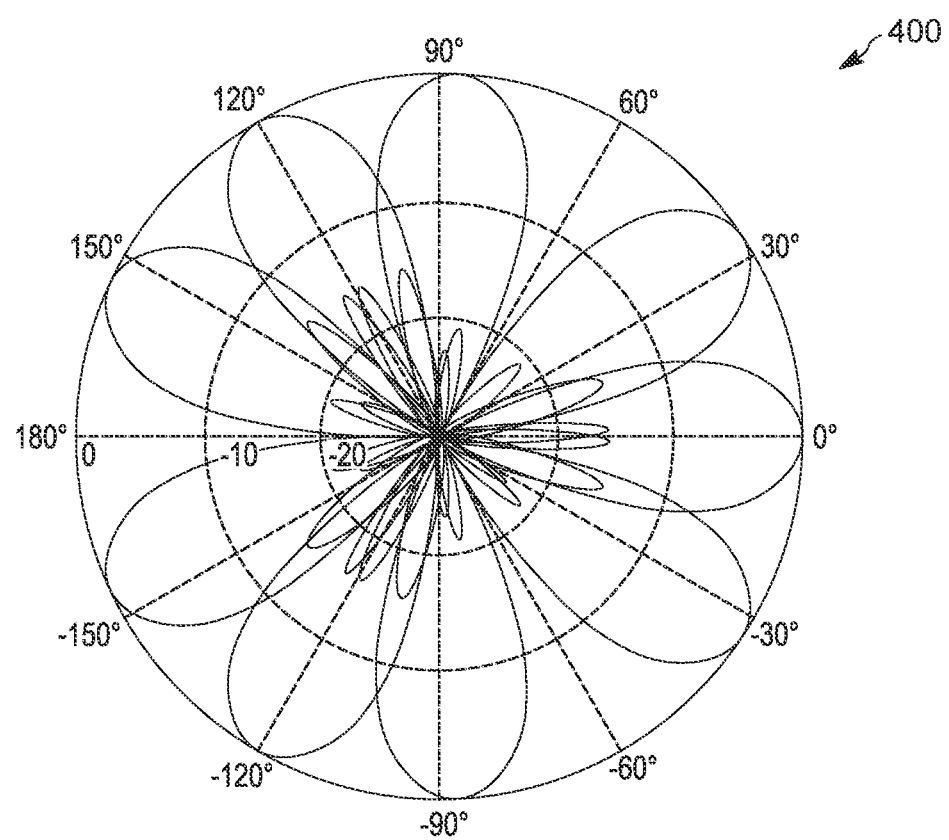
FIG. 4 is a chart illustrating example beamforming characteristics of the communication device of FIG. 2 according to some examples.

At block 302, the electronic processor 205 generates, using a plurality of microphones (e.g., the microphone array 225), a plurality of beams. For example, as illustrated in FIG. 2, the electronic processor 205 may use the adaptive beamformer 235 to produce and steer three or more beams 245. FIG. 4 illustrates an example beam pattern diagram 400 for a communication device 102. The example beam pattern includes three beams providing 360 degrees of coverage. Although the beam pattern diagram is two-dimensional, it should be understood that beams are three-dimensional and may be steered in three dimensions by the electronic processor 205.

Figure 5:
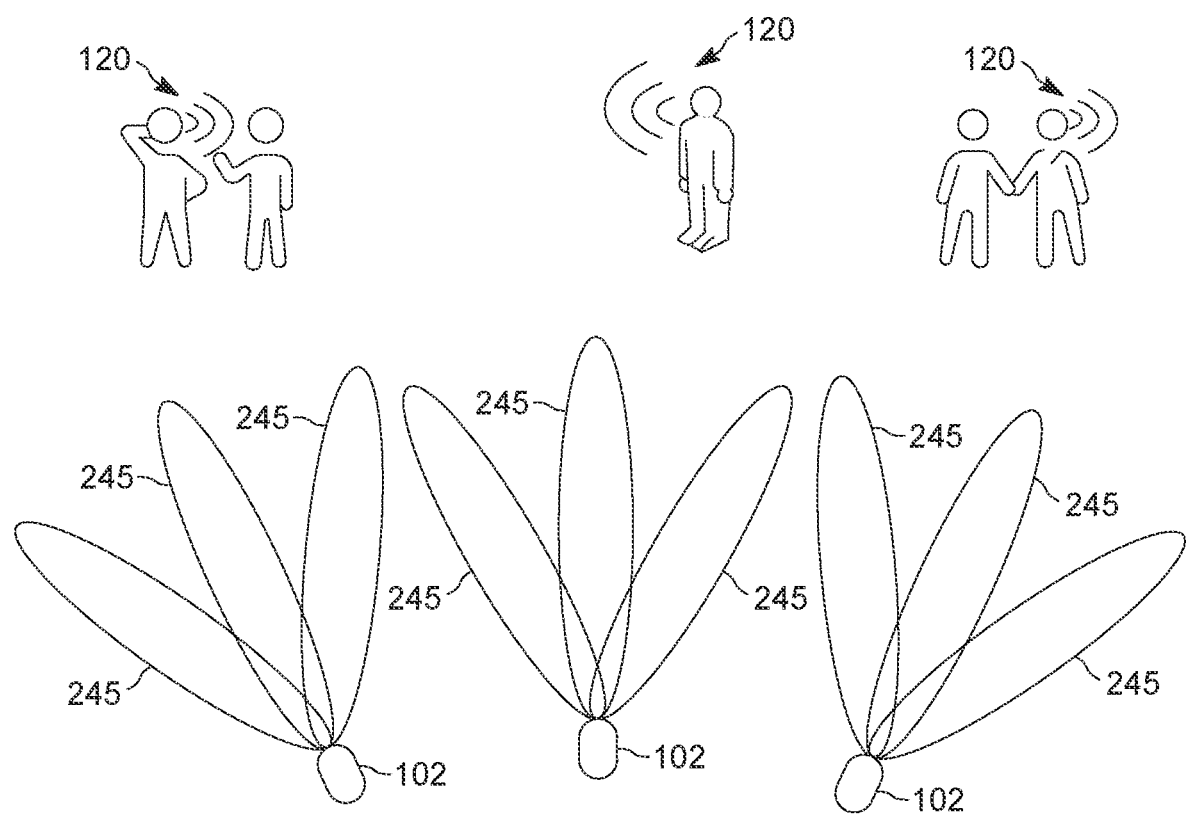
FIG. 5 is a diagram illustrating aspects of the execution of the method of FIG. 3 according to some examples.

At block 304, the electronic processor 205 scans, in parallel, using the plurality of beams, a plurality of simultaneous audio conversations taking place in the crowded area. For example, as illustrated in FIG. 5, the communication devices 102 operate to scan, with their respective beams 245, the audio conversations 120. In some aspects, one or more of the communication devices 102 is a radio speaker microphone operating in an idle mode. In other words, while not being operated to transmit or receive audio, the radio speaker microphone operates to scan for audio conversations. While scanning, the audio conversations 120 are picked up by the beams 245 and processed by the electronic processor 205.

At block 306, the electronic processor 205 identifies and isolates, using audio analytics, a plurality of conversations of interest from among the plurality of scanned audio conversations based on predetermined characteristics indicative of a potential threat. For example, the electronic processor 205 may determine, using audio analytics, that an audio feed picked up by a particular beam is human speech. That audio feed may then be further analyzed using natural language processing (NLP) to look for particular words or phrases indicative of a potential threat. In some instances, unknown words, non sequiturs, or words or phrases that are similarly out of place may be codewords and may be indicative of a potential threat. In some instances, voice analysis may be performed to determine whether a speaker is nervous, afraid, stressed, or otherwise acting in a concerning manner. In some instances, when a conversation is identified as being of interest, the conversation is assigned a unique identifier and the audio is recorded for playback and/or transcription. In some aspects, the position of the conversation (e.g., the person speaking) is determined. For example, comparing the signals from several beams may determine the position of the speaker relative to the communication device. In some instances, the communication device is in communication with other nearby devices capable of detecting the conversation and is able to determine the position of the conversation by comparing signals received at those devices.

Using the position information for the conversation, the electronic processor 205 is able to determine relative vectors for audio beamforming and delta vectors for active tracking as the conversation moves (as described below).

In some instances, conversations of interest may be identified using video analytics (e.g., by the server 110 analyzing video from the camera 118). For example, where a person is talking, but obscuring their mouth (e.g., with a hand or an object), the server 110 may direct nearby communication devices to focus a beam at that person. In another example, where a video classifier identifies wounds on a person, the server 110 may direct nearby communication devices to focus a beam at that person. In another example, where a video classifier identifies one person controlling (e.g., leading by the arm, pushing, pulling) another person, the server 110 may direct nearby communication devices to focus a beam at that person. In another example, video analytics may detect that multiple people are developing an interest in a person (e.g., beginning to watch a person or turn or move away from that person). In such instances, the server 110 may direct nearby communication devices to focus a beam at that person.

In some instances, place guardians are outfitted with augmented reality (AR) glasses, and the place guardians may select sources for tracking through an AR interface. A similar AR interface may also be utilized using a smart telephone.

In some instances, video analysis is used to determine position information for a conversation already detected by a communication device. The electronic processor 205 can use that position information (e.g., received from the server 110) to determine relative vectors for audio beamforming and delta vectors for active tracking as the conversation moves (as described below).

At block 308, the electronic processor 205 determines whether at least two of the plurality of conversations of interest are potentially linked to a single potential threat. For example, the electronic processor 205 may use audio analytics, speech analysis, speech recognition, and other suitable tools to compare conversations of interest with one another to determine whether there is a potential link. For example, two conversations (already identified as directed to a potential threat) may refer to the same location within the venue, the same name, or use similar terms. In another example, speech patterns may be similar, the same language may be used, or the same party may participate in both conversations at different times.

In another example, the electronic processor 205 extracts key concepts or words from an existing conversation of interest and use those key concepts or words to search other identified conversations, including conversations recorded in the recent (e.g., past hour) past. In some aspects, the electronic processor uses the extracted key concepts or words in scanning for new conversations of interest.

In some instances, the electronic processor 205 is configured to generate questions, based on the at least two of the plurality of conversations of interest for selective display or audio playback at one of the plurality of body worn portable public safety communication devices to further determine whether the at least two of the plurality of conversations of interest are potentially linked to a single potential threat.

When the electronic processor 205 is unable to determine that at least two of the plurality of conversations of interest are potentially linked to a single potential threat, it continues scanning audio conversations to identify and isolate conversations of interest (at blocks 304 and 306), as described herein.

At block 310, responsive to determining that at least two of the plurality of conversations of interest are potentially linked to a single potential threat (at block 308), the electronic processor 205 compiles the at least two of the plurality of conversations of interest for playback or transcription. For example, the electronic processor 205 may organize the potentially linked conversations into a list for playback based on a priority, where conversations identified with a higher confidence are assigned a higher priority. In another example, the electronic processor 205 may organize the potentially linked conversations based on the type of potential threat.

Figure 6:
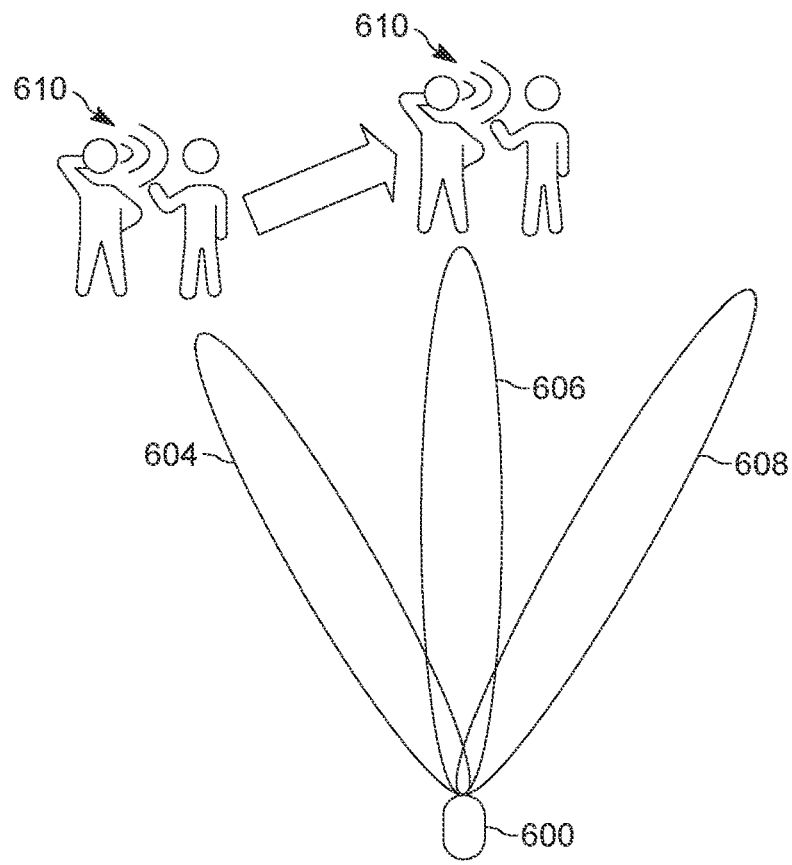
FIG. 6 is a diagram illustrating aspects of the execution of the method of FIG. 3 according to some examples.

In some instances, after identifying and compiling the conversations of interest, the electronic processor 205 may determine that a source of one of the plurality of conversations of interest is moving. For instance, as illustrated in FIG. 6, as the source 610 moves, the communication device 600 may receive an increasingly lower volume audio signal for the conversation on beam 604 and an increasingly higher volume audio signal for the conversation on beam 606, resulting from the movement of the audio source.

In response to detecting this movement, the communication device 600 may steer one or more of the plurality of beams to track the source in response to the movement. For example, the communication device 600 may actively track the source by adjusting beamforming vectors based on the movement to steer beam 606, or another beam, toward the source 610.

In some instances, the communication device 600 shares the detected movement of the source 610 with neighboring communication devices.

In some instances, the server 110 may detect movement of a source using video analytics and direct the communication devices to steer their beams accordingly.

In some instances, the electronic processor 205 arbitrates with another of the plurality of body worn portable public safety communication devices to automatically handoff tracking of the source.

Figure 7:
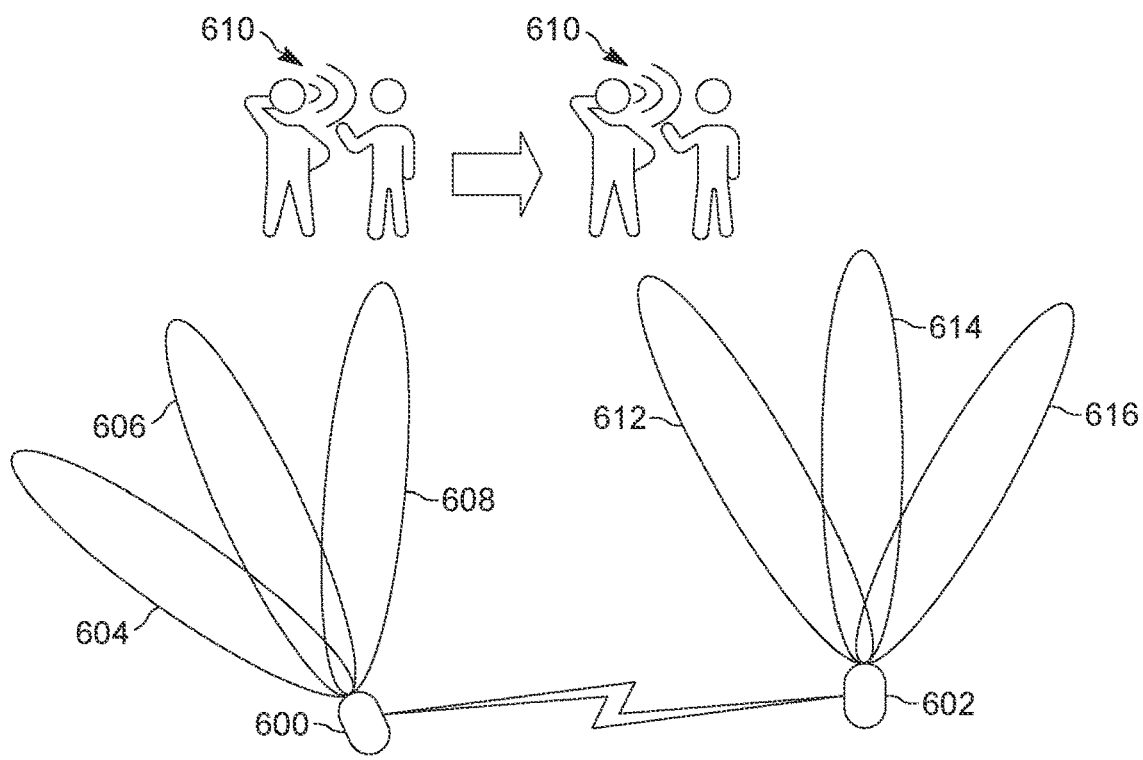
FIG. 7 is a diagram illustrating aspects of the execution of the method of FIG. 3 according to some examples.

In some aspects, a plurality of communication devices collectively adjusts beamforming vectors amongst themselves to maintain active tracking of the at least two of the plurality of conversations of interest. For example, as illustrated in FIG. 7, the source 610 is moving between coverage areas of the communication device 600 and the communication device 602. In the illustrated example, the communication device 600 and the communication device 602 are in communication and handoff tracking between beam 608 and beam 612.

Figure 8:
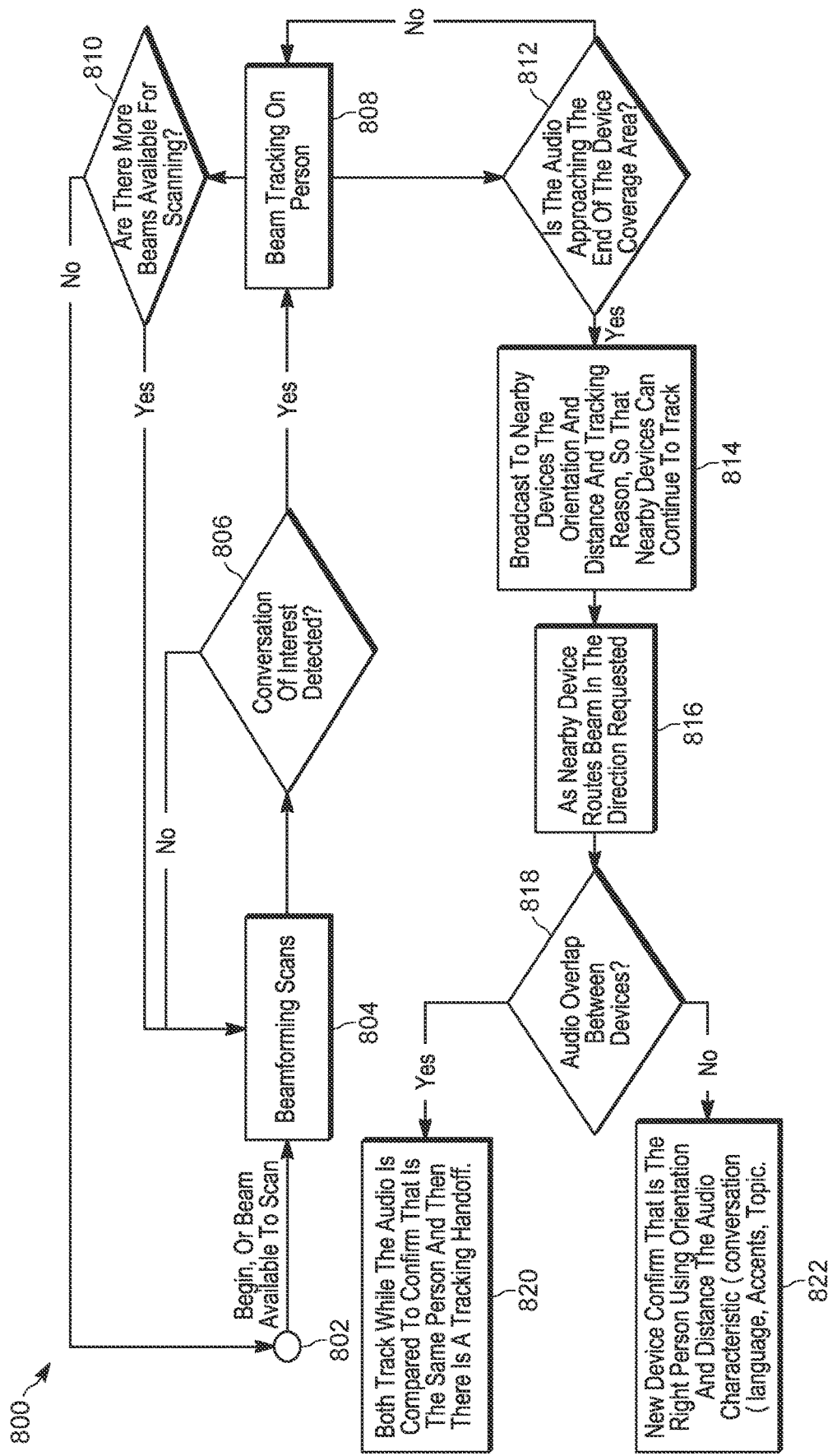
FIG. 8 is a flowchart illustrating a method for tracking conversations of interest among multiple communication devices according to some examples.

FIG. 8 illustrates an example method 800 for handing off tracking between communication devices. The method begins at block 802, where there is a beam available to scan for conversations. At block 804, the beamforming scans for conversations, as described above. At block 806, conversations of interest are detected, as described above. Where no conversations are detected, the method continues scanning at block 804. Where conversations of interest are detected, a beam is used to track a person (e.g., a source of a conversation of interest) at block 808. For example, as illustrated in FIG. 7, the beam 608 is tracking the source 610.

At block 810, where more beams are available for tracking, those beams are used to perform scans (at block 804), or the method waits (at block 802) for beams to become available. For example, as illustrated in FIG. 7, beams 604, 606, 612, 614, and 616 are available for scanning.

At block 812, the method determines whether the audio (i.e., the source) is approaching the end of the device coverage area. For example, as illustrated in FIG. 7, as the source 610 moves, the volume of the audio signal received at the beam 608 will decrease and no corresponding increase will be detected by beams 604 or 606. As a consequence, the device 600 can determine that the source 610 is approaching the end of its coverage area.

Where the audio is not approaching the end of the device coverage area, the beam continues tracking. However, where, as in this example, the source 610 is approaching the end of its coverage area, the communication device 600 broadcasts to nearby devices information needed to track the source 610. For example, the communication device 600 broadcasts to communication device 602 the orientation, distance, and tracking reason (e.g., the type of potential threat), at block 814. At block 816, the nearby device (communication device 602) steers a beam in the direction requested. For example, the communication device 602 steers beam 612 in the direction of the source 610 to take over tracking of the conversation.

At block 818, the method determines whether there is an audio overlap between the devices. For example, the communication device 600 and the communication device 602 may share their received audio to determine whether they can each hear the source 610. Where there is an overlap, both devices track the audio source 610 while continuing to compare audio to confirm that they are tracking the same person, at block 820. When this is confirmed, a handoff occurs.

At block 822, where there is no overlap, the new device (communication device 602 confirms that they have the correct source using the orientation and distance information and based on an audio characteristic. For example, there may be a language, an accent, a topic, a key word, or another characteristic of the conversation now being tracked by the communication device 602 that matches a characteristic of the conversation that the communication device 600 was tracking. By making this comparison, the communication device 602 can determine whether it is tracking the correct conversation.

Returning to FIG. 3, at block 312, the electronic processor 205 generates an alert indicating the availability of the at least two of the plurality of conversations of interest. For example, the electronic processor 205 may present an audio prompt to the operator of the communication device alerting them to one or both of the conversations of interest that are ready to be played back (e.g., on an audio output of the communication device). In another example, the electronic processor 205 generates a visual alert for presentation on a display of the communication device or the console 114. In another example, the electronic processor 205 transmits an alert message to a dispatch center (e.g., the command center 116.

Figure 9:
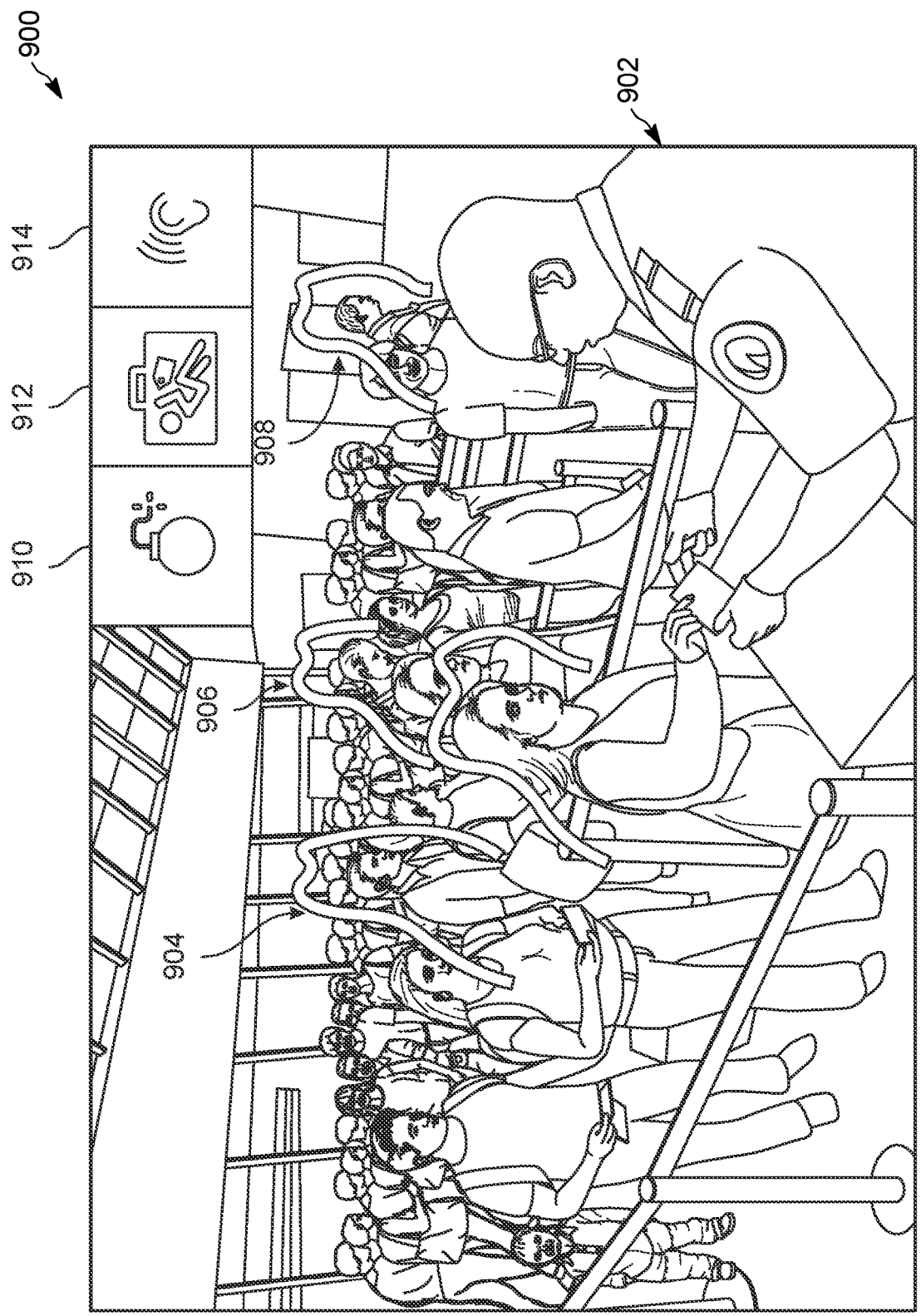
FIG. 9 illustrates an example user interface generated by the system of FIG. 1 according to some examples.

FIG. 9 illustrates an example of a visual alert presented on a user interface 900. The user interface 900 is an augmented reality view of a video feed. In the illustrated example, the place guardian 902 may be the operator of the communication device tracking one or more of the conversations of interest 904, 906, 908. In the illustrated example, the conversations of interest 904, 906, 908 are highlighted within the video frame using an outline overlaid on the source of the conversation of interest. The conversations are further identified with graphical indicators for the type of potential threat. In the illustrated example, the graphical indicator 910 indicates a potential bomb threat, the graphical indicator 912 indicates a potential human trafficking threat, and the graphical indicator 914 indicates a non-specific threat (e.g., a suspicious conversation that requires attention).

The user interface 900 may be presented on a display or the communication device 102, on the console 114, or the display of one or more other communication devices. If an operator wishes to listen to one of the conversations of interest, he or she may select the outline, use a voice command, or use another suitable means to select the conversation for playback. In some aspects, the live conversation is played in real time. In other aspects, the conversation may be played back from the beginning, or based on a requested timeframe.

Alternatively, the user interface 900 may be presented on augmented reality glasses worn by a place guardian.

In some instances, as a person approaches a place guardian, their suspicious audio may be played automatically (e.g., in an earpiece) or an alert may be presented to the place guardian informing them that there is a conversation of interested related to the person. In some aspects, a transcript is presented on a display viewable by the place guardian.

In some instances, audio playback may include a translation from the original language of the conversation to the native language of the place guardian. For example, the place guardian may click a button on an interface of the communication device to enable playback of a translation of the conversation. In another example, translated real audio is played raw at a lower volume and the translation is played on top of the real audio with a higher volume.

In some instances, audio playback to a place guardian is in stereo or spatial sound, to provide the place guardian an indication of the direction of the conversation source.

In some instances, the communication device plays the audio of conversations sequentially until the place guardian confirms (e.g., with a press of a button) which they would like to monitor.

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing." or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about." or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A communication system, the system comprising:
   a plurality of body worn portable public safety communication devices operating in a crowded area, each of the plurality of body worn public safety communication devices including a plurality of microphones and an electronic processor coupled to the plurality of microphones and configured to:
   generate, using the plurality of microphones, a plurality of beams;
   scan in parallel, using the plurality of beams, a plurality of simultaneous audio conversations taking place in the crowded area;
   identify and isolate, using audio analytics, a plurality of conversations of interest from among the plurality of scanned audio conversations based on predetermined characteristics indicative of a potential threat;

determine that at least two of the plurality of conversations of interest are potentially linked to a single potential threat;

responsive to determining that the at least two of the plurality of conversations of interest are potentially linked to the single potential threat, compile the at least two of the plurality of conversations of interest for playback or transcription; and generate an alert indicating the availability of the at least two of the plurality of conversations of interest.

2. The communication system of claim 1, wherein the electronic processor is further configured to:

determine that a source of one of the plurality of conversations of interest is moving; and steer one of the plurality of beams to track the source in response to the movement.

3. The communication system of claim 2, wherein the electronic processor is further configured to:

detect a movement of a source of one of the plurality of conversations of interest using audio analytics; and in response to detecting the movement, steer one of the plurality of beams to actively track the source by adjusting beamforming vectors based on the movement.

4. The communication system of claim 1, wherein the electronic processor is further configured to:

arbitrate with another of the plurality of body worn portable public safety communication devices to automatically handoff tracking of a source of one of the plurality of conversations.

5. The communication system of claim 4, wherein the electronic processors of the plurality of body worn portable public safety communication devices are configured to collectively adjust beamforming vectors amongst the plurality of body worn portable public safety communication devices to maintain active tracking of the at least two of the plurality of conversations of interest.

6. The communication system of claim 1, wherein the electronic processor is further configured to playback one of the plurality of conversations of interest on an audio output of one of the plurality of body worn portable public safety communication devices.

7. The communication system of claim 1, wherein the electronic processor is further configured to playback one of the plurality of conversations of interest on an audio output of one of the plurality of body worn portable public safety communication devices by automatically translating the conversations of interest from one language to another.

8. The communication system of claim 1, wherein the electronic processor is further configured to generate questions, based on the at least two of the plurality of conversations of interest for selective display or audio playback at one of the plurality of body worn portable public safety communication devices to further determine whether the at least two of the plurality of conversations of interest are potentially linked to a single potential threat.

9. The communication system of claim 1, wherein the electronic processor is further configured to generate the alert by performing one selected from the group consisting of presenting an audio alert to an operator of the body worn public safety communication device, presenting a visual alert to an operator of the body worn public safety communication device, and transmitting an alert message to a dispatch center.

10. The communication system of claim 1, wherein each of the plurality of body worn portable public safety communication devices is one selected from the group consisting of a radio speaker microphone, a portable radio, a smart telephone, and a body worn camera.

11. The communication system of claim 1, wherein one of the plurality of body worn portable public safety communication devices is a radio speaker microphone operating in an idle mode.

12. A method for operating a communication system, the method comprising:

generating, using a plurality of microphones for a body worn portable public safety communication device, a plurality of beams;

scanning in parallel, using the plurality of beams, a plurality of simultaneous audio conversations taking place in a crowded area;

identifying and isolating, using audio analytics, a plurality of conversations of interest from among the plurality of scanned audio conversations based on predetermined characteristics indicative of a potential threat;

determining that at least two of the plurality of conversations of interest are potentially linked to a single potential threat;

compiling the at least two of the plurality of conversations of interest for playback or transcription; and generating an alert indicating the availability of the at least two of the plurality of conversations of interest.

13. The method of claim 12, further comprising:

determining that a source of one of the plurality of conversations of interest is moving; and steering one of the plurality of beams to track the source in response to the movement.

14. The method of claim 13, further comprising:

detecting a movement of a source of one of the plurality of conversations of interest using audio analytics; and in response to detecting the movement, steering one of the plurality of beams to actively track the source by adjusting beamforming vectors based on the movement.

15. The method of claim 13, further comprising:

arbitrating with another body worn portable public safety communication device to automatically handoff tracking of the source.

16. The method of claim 14, further comprising:

collectively adjusting beamforming vectors amongst a plurality of body worn portable public safety communication devices to maintain active tracking of the at least two of the plurality of conversations of interest.

17. The method of claim 12, further comprising:

playing back one of the plurality of conversations of interest on an audio output of one of a plurality of body worn portable public safety communication devices.

18. The method of claim 12, wherein playing back one of the plurality of conversations of interest on an audio output of one the body worn portable public safety communication device includes automatically translating the conversations of interest from one language to another.

19. The method of claim 12, further comprising:

generating questions, based on the at least two of the plurality of conversations of interest for selective display or audio playback at one of the plurality of body worn portable public safety communication devices to further determine whether the at least two of the plurality of conversations of interest are potentially linked to a single potential threat.

20. The method of claim 12, further comprising:
generating the alert by performing one selected from the group consisting of presenting an audio alert to an operator of the body worn public safety communication device, presenting a visual alert to an operator of the body worn public safety communication device, and transmitting an alert message to a dispatch center.

21. The method of claim 12, wherein the body worn portable public safety communication device is one selected from the group consisting of a radio speaker microphone, a portable radio, a smart telephone, and a body worn camera.

22. The method of claim 12, wherein the body worn portable public safety communication device is a radio speaker microphone operating in an idle mode.

\* \* \* \* \*